Patented Dec. 17, 1940

2,225,256

UNITED STATES PATENT OFFICE 2,225,256

COATING COMPOSITION

William P. Colio, Rutledge, Pa., assignor to E. I. du Pont de Nemours & Company, Wilmington, Del., a corporation of Delaware No Drawing. Application July 6, 1938,
Serial No. 217,780

5 Claims. (Cl. 260—3)

This invention relates to decorative and protective coating compositions and more particularly to coating compositions of the urea-aldehyde type and to articles coated with such compositions.

In the use of sheet metal material for various purposes coating compositions of various types are usually applied for decorative and protective purposes. Such decorated and protected metal sheet material is often subjected to stamping operations and in many instances the coating thereon will not withstand such treatment without cracking. Furthermore, the coated metal sheet material is used for signs and display purposes and is subjected to often rather severe exposure of the elements. For this purpose a hard, tough and yet flexible coating is necessary. It is also desirable for economic purposes that the compositions may be of such a nature as to permit baking at relatively high temperatures and produce hard, tough and flexible coatings.

The urea-aldehyde condensation products possess to a high degree the properties desired in coated products of the above mentioned kind. The urea-formaldehyde-monohydric alcohol resinous compositions in particular yield films which are especially suited for the present purpose. But in using resins of this kind it has heretofore been necessary to use so-called polymerization accelerators such as rather strong acids in order to provide the necessary, hard, tough and flexible film with the requisite adhesion to the metal at the rather high temperature short time baking schedule required for economic purposes. The use of such acids is not, however, satisfactory from a commercial standpoint, particularly where the finishing compositions are packaged and subjected to storage before use. Various types of acid producing substances such as acid salts, etc. have been suggested for use with urea-formaldehyde molding compositions but these have been found to be too reactive and not reliably stable at even normal storage temperatures when used in coating compositions. Further, such materials serve no other purpose in the film forming composition and possess no other function such as a film forming or plasticizing agent.

This invention has as an object a method for successfully using resinous compositions of the above mentioned kind as baked protective and decorative coatings. A further object is the production of coating compositions having increased toughness of film after baking. A still further object is the provision of sheet metal articles carrying thereon a decorative and protective coating of compositions of the kind described herein. Other objects will appear hereinafter.

It has now been found that certain chlorinated materials not only contribute valuable film-forming constituents to the compositions but also liberate acidic products on being subjected to the temperatures such as are used in baking the decorative and protective coating compositions applied to metal and other surfaces which accelerate the polymerization of the resinous base material in the coating composition. In accomplishing the above objects I include in the coating composition chlorinated rubber as an acid liberating and film forming ingredient.

The resins most valuable for the present purpose and which are designated as urea-formaldehyde-monohydric alcohol resins are the resins described in Patent No. 2,191,957. These resins are prepared by reacting in the presence of an acid or other catalyst (mercuric, aluminum, ferric, or stannic chlorides, acid resins, halogens, etc.) ingredients consisting solely or essentially of urea, formaldehyde, and a monohydric aliphatic alcohol. The heating of the reaction product of the urea and formaldehyde with the alcohol is continued in the presence of a hydrocarbon such as benzene or toluene with separation of water of reaction from the condensed hydrocarbon and return of the latter to the reaction mixture until substantially two molecules of water for each molecule of urea are eliminated and a product is obtained which contains an amount of combined monohydric alcohol equivalent from one-half to about one molecule of alcohol for each molecule of urea. In accordance with this procedure a mixture containing all the ingredients may be reacted, or the alcohol may be heated, accompanied by the mentioned separation of water, with preformed urea-aldehyde reaction product. With the use of some alcohols it may not be necessary to use in addition a hydrocarbon since the water may be satisfactorily removed by other means, as for instance by the use of silica gel in the separator, or by the use of an auxiliary fractionating column to separate the water from the alcohol before the latter is returned to the reaction vessel. These resins yield upon treatment with zinc chloride and acetic anhydride, the acetate of the alcohol.

The following is a description of specific procedure that may be used in preparing a urea-formaldehyde-alcohol resin.

Sixteen hundred (1600) parts by weight of aqueous formaldehyde containing approximately 37% of formaldehyde in solution are placed in a suitable container and 19 grams of sodium acid phosphate (NaH$_2$PO$_4$) added. The resulting solution is adjusted to a pH of 7.6 by the addition of a solution of sodium hydroxide, the amount required depending upon the acidity of the formaldehyde solution used. Five hundred forty (540) parts by weight of urea are then dissolved in the formaldehyde solution and the mixture allowed to stand for approximately 96 hours, the temperature being maintained below 30° C., preferably between 20° and 30° C., by means of a cooling coil placed in the liquid or other suitable means. Crystallization of the reaction material sets in usually within from 12 to 24 hours and after a period of 96 hours the container will be found to contain a practically solid mass of crystals. The crystals are filtered and dried and a yield of about 85% of the theoretical available is obtained. This dried reaction product of urea and formaldehyde is used as the intermediate A in the next step of the process.

Fifteen hundred (1500) parts by weight of isobutyl alcohol are placed in a still or reaction vessel. One hundred (100) parts by weight of toluol are then added, followed by the addition of 750 parts by weight of the intermediate product (A) referred to above and then 15 parts by weight of phthalic anhydride are added.

Heat is then applied to the reaction vessel and the distillation allowed to proceed at a fairly rapid rate. The liquid which is condensed in the condenser is passed into a separator where it separates into two layers with the organic solvent material forming the upper layer. This material is returned to the reaction vessel and the water layer discarded. Distillation is continued until substantially 2 molecules of water have been eliminated from the mass in the reaction vessel. The distillation is then continued beyond this point and the distillate not returned to the reaction vessel but removed from the separator as the water is in the early stage of the process. This continued distillation results in practically complete removal of water from the reaction vessel and also in a concentration of the solution in the reaction vessel. The urea-formaldehyde-alcohol reaction product may be prepared, if desired, by reacting e. g. normal butyl alcohol, paraformaldehyde (which is brought into solution with a small amount of alkali as sodium hydroxide) and urea together with the necessary catalyst in the same or a similar apparatus as used in the first procedure described, the heating and distillation being carried out in the same manner.

In place of the urea-formaldehyde-monohydric alcohol resin solution, methylol urea, alkyl or aryl ether solutions may be used or further resin solutions prepared from the crystalline ethers. Procedures for preparing such ethers and resin solutions are described in copending applications Serial Numbers 184,454, 184,455 and 184,456 filed December 17, 1937 in the name of Ben E. Sorenson.

The invention will be more fully understood by the following examples in which the parts are by weight:

EXAMPLE I

*White baking enamel*

| | |
|---|---|
| Urea - formaldehyde - monohydric alcohol resin (solids) | 21.7 |
| Titanium dioxide | 33.0 |
| Tricresyl phosphate | 10.0 |
| Chlorinated rubber | 1.7 |
| Volatile solvent | 33.6 |
| | 100.0 |

The volatile solvent in this example, as well as in the following examples, is comprised of butyl alcohol, butyl Cellosolve and high solvency petroleum naphtha.

In general solvents of the type of alcohols, ether-alcohols, ketones, esters and aromatic hydrocarbons may be used.

The enamel may be prepared by dispersing the pigment (e. g., in a ball mill) in all or a portion of the urea-formaldehyde-monohydric alcohol resin with a portion of the solvent, adding the balance of the volatile solvent and the chlorinated rubber (and the remainder of the resin solution if all was not used in dispersing the pigment) and thoroughly mixing in a suitable agitator or by any other conventional means well known in the art.

The composition may be applied to suitably prepared surfaces such as sheet metal by the well known procedures of spraying, roller coating, brushing or in certain instances by dipping, and when baked for approximately 15 minutes at a temperature of approximately 250° F. produces a hard and tough film which possesses excellent adhesion to the surface to which it is applied.

The time and temperature of baking may be varied to conform with other conditions, a satisfactory temperature range being between 200°–500° F. and a satisfactory time range being for from 1 minute to 1 hour.

EXAMPLE II

| | |
|---|---|
| Urea - formaldehyde - monohydric alcohol resin (solids) | 9.0 |
| Titanium dioxide | 34.0 |
| Plasticizer | 19.3 |
| Chlorinated rubber | 1.3 |
| Volatile solvent | 36.4 |
| | 100.0 |

The plasticizer in this composition is composed of 18 parts of a fatty oil modified polyhydric alcohol-polybasic acid resin (a 45% soyabean oil modified glyceryl phthalate) and 1.3 parts of tricresyl phosphate. This composition finds particular adaptation to so-called tin decorating of signs, display racks, etc.

The namel may be prepared as described under Example I.

EXAMPLE III

| | |
|---|---|
| Urea-formaldehyde-monohydric alcohol resin (solids) | 23.00 |
| Titanium dioxide | 33.00 |
| Plasticizer (tricresyl phosphate) | 10.00 |
| Chlorinated rubber | .08 |
| Volatile solvent | 33.92 |
| | 100.00 |

This composition contains a smaller amount of acid liberating chlorinated material (chlorinated rubber) than the previous examples, such compositions being particularly adaptable for certain uses.

This enamel as well as succeeding examples may be prepared as described under Example I.

EXAMPLE IV

| | |
|---|---|
| Urea - formaldehyde - monohydric alcohol resin (solids) | 20.0 |
| Titanium dioxide | 30.0 |
| Tricresyl phosphate | 6.0 |
| Chlorinated rubber | 3.0 |
| Volatile solvent | 41.0 |
| | 100.0 |

The composition of this example is especially adapted as a film-forming material to be applied to sheet metal container closures and screw caps and as metal primers.

A satisfactory baking schedule for this composition is approximately 15 minutes at 250° F. The time of baking may be reduced with increase in temperature if desired.

While the above examples are those of pigmented compositions, unpigmented compositions of the same general type may be prepared. As examples of such are the following:

EXAMPLE V

| | |
|---|---|
| Urea - formaldehyde - monohydric alcohol resin | 14.0 |
| Plasticizer | 23.0 |
| Chlorinated rubber | 2.0 |
| Volatile solvent | 61.0 |
| | 100.0 |

The plasticizer in this composition was comprised of 21 parts of a fatty oil modified polyhydric alcohol-polybasic acid resin and 2 parts of tricresyl phosphate.

EXAMPLE VI

| | |
|---|---|
| Urea - formaldehyde - monohydric alcohol resin | 28.0 |
| Plasticizer (tricresyl phosphate) | 8.0 |
| Chlorinated rubber | 4.0 |
| Volatile solvent | 60.0 |
| | 100.0 |

These unpigmented compositions are especially useful as protective coatings for previously coated sheet metal or as a size coating on metal which is to be subsequently coated with pigmented coatings. They may be baked to hard, tough and firmly adhering coatings at a temperature range of from 200° F. to 500° F. They are particularly adapted to short baking periods at rather high temperatures, e. g., for 10 minutes at 300° F.; 5 minutes at 350° F.; or 1 minute at 500° F.

In the examples of the pigmented compositions described above, titanium dioxide was used as the pigment constituent. Other pigments may also be used in the compositions either alone or in admixture to produce enamels of various colors. These compositions are, however, of particular value when produced with white pigments since they are highly resistant to yellowing on baking and substantially non-yellowing in service. However, as previously indicated the compositions are not limited to the use of white pigments in general or titanium dioxide in particular.

The chlorinated rubber used in the compositions is preferably the fully chlorinated type with a chlorine content of approximately 65%. However, chlorinated rubber of lower chlorine content may be used, some compositions requiring a somewhat greater percentage of this component. As previously noted, the chlorinated rubber, in addition to liberating a small quantity of mineral acid when the coating is baked, which acid acts as an accelerator in polymerizing the urea-formaldehyde-monohydric alcohol resin, serves also as a film-forming constituent. In this respect it differs from other acid liberating materials which have been used with certain types of resinous materials to promote polymerization. Further, the chlorinated rubber is reliably stable at ordinary storage temperatures so that substantially no change in viscosity of the compositions occurs on storage. Such stability is not found in compositions where the usual type of acid liberating accelerators are used.

The chlorinated rubber used in the examples may be replaced by various types of chlorinated rubber-like materials such as chlorinated balata, chlorinated gutta-percha, chlorinated so-called synthetic rubbers, or rubber substitutes, etc.

In addition to tricresyl phosphate and the oil modified polyhydric alcohol-polycarboxylic acid resin given in the examples as plasticizers, dibutyl phthalate, blown castor oil, dibutyl Cellosolve phthalate, diamyl and diethyl phthalate, Cellosolve stearate, butyl stearate, etc., may also be used.

The ingredients of the composition of the present invention may conveniently vary within the following ranges: urea-formaldehyde-monohydric alcohol resin 9–35%; pigment 30–40%; plasticizer 1.5–72%; chlorinated rubber or equivalent 0.05–4.5%; volatile solvent 25–65%.

The coating compositions of the invention are particularly adapted for use in forming films on container caps and closures which after being coated and punched, are subjected to high temperatures to vulcanize the rubber gasket usually used.

They are further of value in producing decorative and protective coatings on sheet metal and articles made therefrom for use as signs, display racks, containers for various purposes, refrigerator cabinets, lockers, etc. Because of the desirable properties possessed by the coatings, many other uses of the compositions will suggest themselves to those skilled in the art of using such compositions.

Although the present invention is particularly advantageous in the production of improved coating compositions and decorative and protective films, the new resinous compositions containing chlorinated rubber also yield castings or molded articles of superior properties.

As many apparently widely different embodiments of this invention may be made without departing from the spirit and scope thereof, it is to be understood that I do not limit myself to the specific embodiments thereof except as defined in the appended claims.

I claim:

1. A coating composition comprising a heat hardening urea-formaldehyde resin and from about 0.05% to 4.5% of chlorinated rubber.

2. A coating composition comprising a heat hardening urea-formaldehyde-monohydric alcohol resin and from about 0.05% to 4.5% of chlorinated rubber.

3. A coating composition comprising a heat hardening urea-formaldehyde-monohydric alcohol resin, volatile solvent, plasticizer and from about 0.05% to 4.5% of chlorinated rubber.

4. A coating composition comprising a heat hardening urea-formaldehyde-monohydric alcohol resin, volatile solvent, plasticizer, titanium pigment, and from about 0.05% to 4.5% of chlorinated rubber.

5. An article coated with a tough, flexible coating of baked film comprising urea-formaldehyde-monohydric alcohol resin and from about 0.05% to 4.5% of chlorinated rubber.

WILLIAM P. COLIO.